United States Patent [19]

Spillman, Jr.

[11] Patent Number: 5,602,540
[45] Date of Patent: Feb. 11, 1997

[54] FLUID GAUGING APPARATUS WITH INDUCTIVE INTERROGATION

[75] Inventor: William B. Spillman, Jr., Charlotte, Vt.

[73] Assignee: Simmonds Precision Products Inc., Akron, Ohio

[21] Appl. No.: 245,945

[22] Filed: May 19, 1994

Related U.S. Application Data

[63] Continuation-in-part of Ser. No. 76,322, Jun. 14, 1993, Ser. No. 76,514, Jun. 15, 1993, abandoned, and Ser. No. 76,512, Jun. 14, 1993, Pat. No. 5,433,115.

[51] Int. Cl.$^6$ .................................................. G08C 19/10
[52] U.S. Cl. .............................. 340/870.37; 340/870.31; 73/304 C
[58] Field of Search .................... 340/618, 620, 340/870.01, 870.31, 870.37, 870.33; 73/304 C, 290 R

[56] References Cited

U.S. PATENT DOCUMENTS

| | | | |
|---|---|---|---|
| 2,447,734 | 8/1948 | Capuzzi | 323/75 |
| 3,224,257 | 12/1965 | Takami et al. | 73/85.5 |
| 3,310,736 | 3/1967 | Bayly et al. | 324/62 |
| 3,588,687 | 6/1971 | Kohler | 324/41 |
| 3,719,935 | 3/1973 | Chaney et al. | 340/206 |
| 3,758,845 | 9/1973 | MacKelvie et al. | 323/51 |
| 3,876,998 | 4/1975 | Richter et al. | 340/189 |
| 4,002,967 | 1/1977 | Fennell | 324/40 |
| 4,002,996 | 1/1977 | Klebanoff et al. | 340/620 |
| 4,165,641 | 8/1979 | Pomerantz et al. | 73/304 C |
| 4,223,300 | 9/1980 | Wiklund | 340/196 |
| 4,225,851 | 9/1980 | Reschovsky et al. | 340/177 CA |
| 4,367,460 | 1/1983 | Hodara | 340/550 |
| 4,425,511 | 1/1984 | Brosh | 307/106 |
| 4,470,300 | 9/1984 | Kobayashi | 73/304 C |
| 4,567,459 | 1/1986 | Folger et al. | 340/58 |
| 4,578,992 | 4/1986 | Galasko et al. | 73/146.5 |
| 4,590,466 | 5/1986 | Wiklund et al. | 340/870.28 |
| 4,646,066 | 2/1987 | Baughman et al. | 340/540 |
| 4,679,433 | 7/1987 | Clinton et al. | 73/304 C |
| 4,682,104 | 7/1987 | Lombard et al. | 324/208 |
| 4,717,905 | 1/1988 | Morrison et al. | 340/58 |
| 4,725,839 | 2/1988 | Crowe | 340/870.31 |
| 4,741,341 | 5/1988 | Marach | 128/419 PT |
| 4,743,786 | 5/1988 | Ichikawa et al. | 310/111 |
| 4,781,056 | 11/1988 | Noel et al. | 73/1 B |
| 4,800,755 | 1/1989 | Fathauer et al. | 73/304 C |
| 4,808,911 | 2/1989 | Oaks | 324/57 Q |
| 4,891,973 | 1/1990 | Bollweber et al. | 73/146.5 |
| 4,900,921 | 2/1990 | Spillman, Jr. | 250/227 |
| 4,904,863 | 2/1990 | McDearmon | 250/227 |
| 4,922,096 | 5/1990 | Brennan | 244/3.16 |
| 4,930,852 | 6/1990 | Wheeler et al. | 350/96.1 |
| 4,983,034 | 1/1991 | Spillman, Jr. | 356/32 |

(List continued on next page.)

FOREIGN PATENT DOCUMENTS

| | | |
|---|---|---|
| 62-049279 | 3/1987 | Japan . |
| 3-274420 | 12/1991 | Japan . |
| 4-116425 | 4/1992 | Japan . |
| WO9100985 | 1/1991 | WIPO . |

OTHER PUBLICATIONS

S. F. Masri et al, "Structure–unknown non–linear dynamic systems: identification through neural networks," 1992.

Primary Examiner—Jeffery Hofsass
Assistant Examiner—Daniel J. Wu
Attorney, Agent, or Firm—Richard A. Romanchik; Leonard L. Lewis

[57] ABSTRACT

A gauging apparatus for fluid containers such as fuel tanks includes a capacitance disposed in the container that changes value based on the volume of fluid in the container; a first antenna disposed below an outer surface of the container and coupled to the capacitance; a second antenna magnetically coupled with the first antenna across a coreless gap; and a gauging circuit coupled to the second antenna and comprising an oscillator for applying an excitation signal at a number of different frequencies to the second antenna, and a signal processing circuit that detects current in the second antenna caused by the excitation signal and by current in the first antenna related to the capacitance value.

28 Claims, 6 Drawing Sheets

U.S. PATENT DOCUMENTS

| | | | |
|---|---|---|---|
| 4,983,964 | 1/1991 | Van de Pas | 340/870.31 |
| 4,984,863 | 1/1991 | Parriaux et al. | 350/96.11 |
| 5,005,409 | 4/1991 | Hochstein | 73/304 C |
| 5,049,856 | 9/1991 | Crossfield | 340/551 |
| 5,058,436 | 10/1991 | Bellec et al. | 73/727 |
| 5,086,274 | 2/1992 | Gobin et al. | 324/239 |
| 5,107,833 | 4/1992 | Barsness | 128/419 PT |
| 5,144,299 | 9/1992 | Smith | 340/870.18 |
| 5,150,115 | 9/1992 | deJong et al. | 340/870.31 |
| 5,153,583 | 10/1992 | Murdoch | 340/825.54 |
| 5,165,283 | 11/1992 | Kurtz et al. | 73/727 |
| 5,181,423 | 1/1993 | Phillips et al. | 73/724 |
| 5,196,845 | 3/1993 | Myatt | 340/870.31 |
| 5,278,442 | 1/1994 | Prinz et al. | 257/417 |

FLUID GAUGING APPARATUS WITH INDUCTIVE INTERROGATION

This application is a continuation-in-part of the following U.S. patent applications: Ser. No. 08/076,322 filed on Jun. 14, 1993 entitled "EMBEDDABLE DEVICE FOR CONTACTLESS INTERROGATION OF SENSORS FOR SMART STRUCTURES"; Ser. No. 08/076,514 filed on Jun. 15, 1993 entitled "APPARATUS FOR INTERROGATING SMART STRUCTURE SENSORS", now abandoned; and Ser. No. 08/076,512 filed on Jun. 14, 1993 entitled "CONTACTLESS INTERROGATION OF SENSORS FOR SMART STRUCTURES", now U.S. Pat. No. 5,433,115; all of which are owned in common by the assignee of the present application.

BACKGROUND OF THE INVENTION

The invention relates generally to fluid gauging apparatus and methods such as used for fuel gauging on aircraft. More particularly, the invention relates to apparatus and methods for inductive interrogation of fluid gauging sensors.

Significant advances have been made in developing new high performance materials such as, for example, graphite/epoxy composites. These materials and many other composite types hold great promise for replacing conventional materials such as steel and aluminum in structures subjected to various environmental conditions such as high temperature, pressure, stress and strain. For example, carbon composite materials are expected to be used extensively in next generation aircraft for structures such as the wings and other air foil surfaces, engine drive shafts and so on just to name a few examples.

Although these materials have been shown to offer substantial benefits over conventional materials, industry acceptance of these materials, especially in the aerospace industry, has been limited due to the lack of statistical databases on their failure modes because of their relatively recent introduction. This situation presents a catch-22 because until such materials have been subjected to extensive use, such databases will remain relatively unavailable. Also, the lack of statistical analysis results in structures using these materials being over designed to the point that the benefits of using the improved materials are reduced or eliminated altogether.

Because of the need to characterize the real-world performance of these materials, extensive activity has been undertaken to develop "smart" structures in which the structures include embedded or integrated sensors that monitor one or more structural parameters such as stress, strain etc. Such smart structures are described, for example, in U.S. Pat. Nos. 4,983,034 and 4,930,852 issued to Spillman and Wheeler et al. respectively, and commonly owned by the assignee of the present invention, the entire disclosures of which are fully incorporated herein by reference. The basic concept is that the integrated sensors can be used as health monitors for the structure to characterize the structural performance of the materials. Having such real time or near real time information can allow structures to be designed up to the material limits. In fact, the structures can further include active elements that provide adaptive compensation for structure performance. Such a smart structure concept is disclosed in U.S. Pat. No. 4,922,096 issued to Brennan and U.S. patent application Ser. No. 07/981,966 filed on Nov. 25, 1992 for "Smart Structure With Non-Contact Power and Data Interface", which are commonly owned by the assignee of the present invention, the entire disclosures of which are fully incorporated herein by reference.

Optical sensors such as those described in the referenced patents are a desirable solution to providing smart structures. Such sensors conveniently use optic fibers as part of the active sensor element, and of course, optic fibers are small and flexible thus making them ideal for embeddment in composite structures without adversely affecting structural integrity. For example, structural strain can be monitored by transmitting light through one or more embedded optic fibers that bend under stress, strain etc. thus affecting the transmission characteristics of the light through the fiber.

The successful use of such smart structures, optics based or otherwise, requires a reliable and accurate way to interrogate the sensors. Optical sensors present a particularly difficult ingress/egress data and power problem because light energy must be delivered to the sensor and the output light pattern or signals corresponding thereto must be coupled back out to the outside world for processing and analysis. Using hardwired or other mechanical, electrical or optical connections between the sensors and external hardware is difficult from a manufacturing stand point due to the need for precise machining and very tight tolerances to allow efficient coupling. Although it is generally known to use RF coupling for contactless interrogation of some sensors such as tire pressure sensors, such approaches typically depend on frequency domain analysis (such as by detecting a resonant frequency shift based on a sensed parameter) and do not provide compensation for the gap between the transmitting and receiving coils. These approaches are not practical, therefore, for resistive sensors, nor for extracting data from optical sensors because these sensors produce amplitude dependent outputs.

In addition to the desirability of being able to characterize the performance of composite materials and to interrogate sensors embedded therein, in some applications a sensor can be contained within a composite enclosure. For example, in a composite fuel tank on an aircraft, there may be one or more fuel quantity sensors. Such sensors can be capacitive fuel level sensors or pressure sensors, to name just two examples. In order to maintain structural integrity of the fuel tank, it is desirable that the sensors be interrogated without hardwire connections or the like, because such an arrangement could compromise the structural integrity due to the need to provide access the sensors.

Accordingly, the objective exists for non-contact apparatus and methods for interrogating smart structure sensors, particularly sensors enclosed in composite structures such as within a fuel tank or other fluid container.

SUMMARY OF THE INVENTION

In response to the aforementioned objectives, the invention contemplates in one embodiment a fluid gauging apparatus for a tank comprising composite materials, the apparatus comprising a capacitance that changes value based on the volume of fluid in the tank; a first antenna coupled to the capacitance and embedded in or disposed on a tank wall; a second antenna disposed exterior the tank and electromagnetically coupled to the first antenna; and detector means for applying a number of excitation frequencies to the second antenna and for detecting current flow through the second antenna caused by the excitation signals and mutual coupling with the first antenna to determine the fluid quantity as a function of the capacitance.

The invention also contemplates the methods embodied in the use of such apparatus as well as a method for gauging fluid quantity in a tank, comprising the steps of:

a. using a capacitance as a variable parameter related to fluid quantity in the tank;

b. using a first antenna to form a resonant circuit with the capacitance such that the resonant circuit has a resonance frequency that varies with the capacitance value; and c. using a second antenna to electromagnetically interrogate the resonant circuit across a coreless gap based on a number of excitation frequencies applied thereto.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
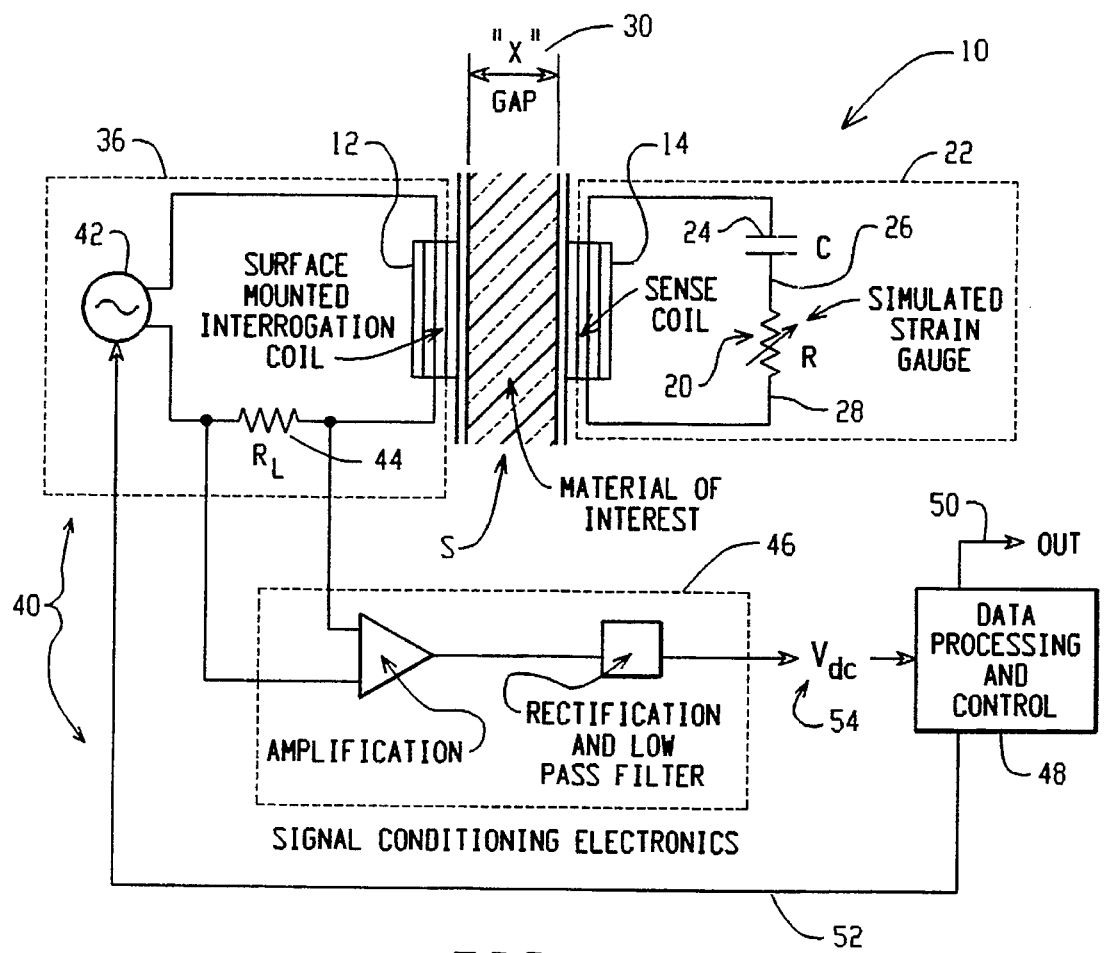
FIG. 1 is a simplified diagram of a sensor interrogation apparatus according to the present invention for contactless interrogation of sensors used in or on structures.

With reference to FIG. 1, we show in diagrammatic form an apparatus 10 that embodies the present invention for contactless interrogation of a sensor or plurality of sensors embedded in a structure. Although specific reference is made herein to embedded sensors, those skilled in the art will readily appreciate that the term "embedded" is intended to be interpreted in its broadest sense to include, for example, sensors disposed on a surface of or integrated with a structure. In addition, the term "contactless" is intended to be construed in its broadest sense wherein data and/or energy are coupled into and/or out of the structure by magnetic coupling rather than, for example, with electrical or optical contacts. The particular structure involved in the use of the invention may be any structure made of material compatible with apparatus and methods embodying the invention. Such materials include graphite/epoxy composites, fiberglass, plexiglass and so on to name just a few. Clearly, this list is intended to be representative and not exhaustive of the possible choices of material available to the applications designer. The material selected, however, should be relatively non-absorptive of the electromagnetic energy spectrum used to interrogate the sensor(s).

The apparatus 10 includes a preferably surface mounted primary or interrogation coil 12, and a secondary or sense coil 14. In the example of FIG. 1, the sense coil 14 is embedded in a structure, S, although typically the sense coil will be disposed at or near a surface of the structure. The sense coil is part of a resonant sensing circuit that is embedded in the structure and which, in combination with the other components of the apparatus 10, is used for detecting the condition or output of a sensor dependent element 20 that is embedded in the structure. In one example described herein, the sensor dependent element 20 is a variable resistance strain gauge for detecting structural stress and strain forces that the structure S is subjected to. However, this specific example is intended to be exemplary and not limiting. For example, in the embodiment of FIG. 7, the element 20' may be a photoresistor that exhibits a resistance related to intensity of light energy incident thereon. Thus, the invention can be used with any sensor that produces a variable resistance output, or that produces an output that can be converted to a variable resistance, or that produces an output that can change or modulate the value of one or more of the resonant circuit components. As a further example, an optical sensor that produces an output consisting of modulated light beams can be interrogated by using the output light to affect an impedance in the apparatus 10, such as the photosensitive resistor of FIG. 7.

As stated, the sense coil 14 is connected in a resonant sensing circuit 22 that includes the sensor dependent element 20 and a capacitance 24. It is important to bear in mind that the variable resistance R used in FIG. 1 to represent the sensor 20, may in actual practice be a resistance that is affected by the output of the sensor, and not part of the sensor itself. The sensor itself can thus be disposed within the structure S at any desired location and connected to the resonant circuit by leads 26, 28. For example, in the case of an optical sensor, the sensor output could be coupled to the sensor dependent element 20 by optic fibers embedded in the structure with the sensor.

Figure 5:
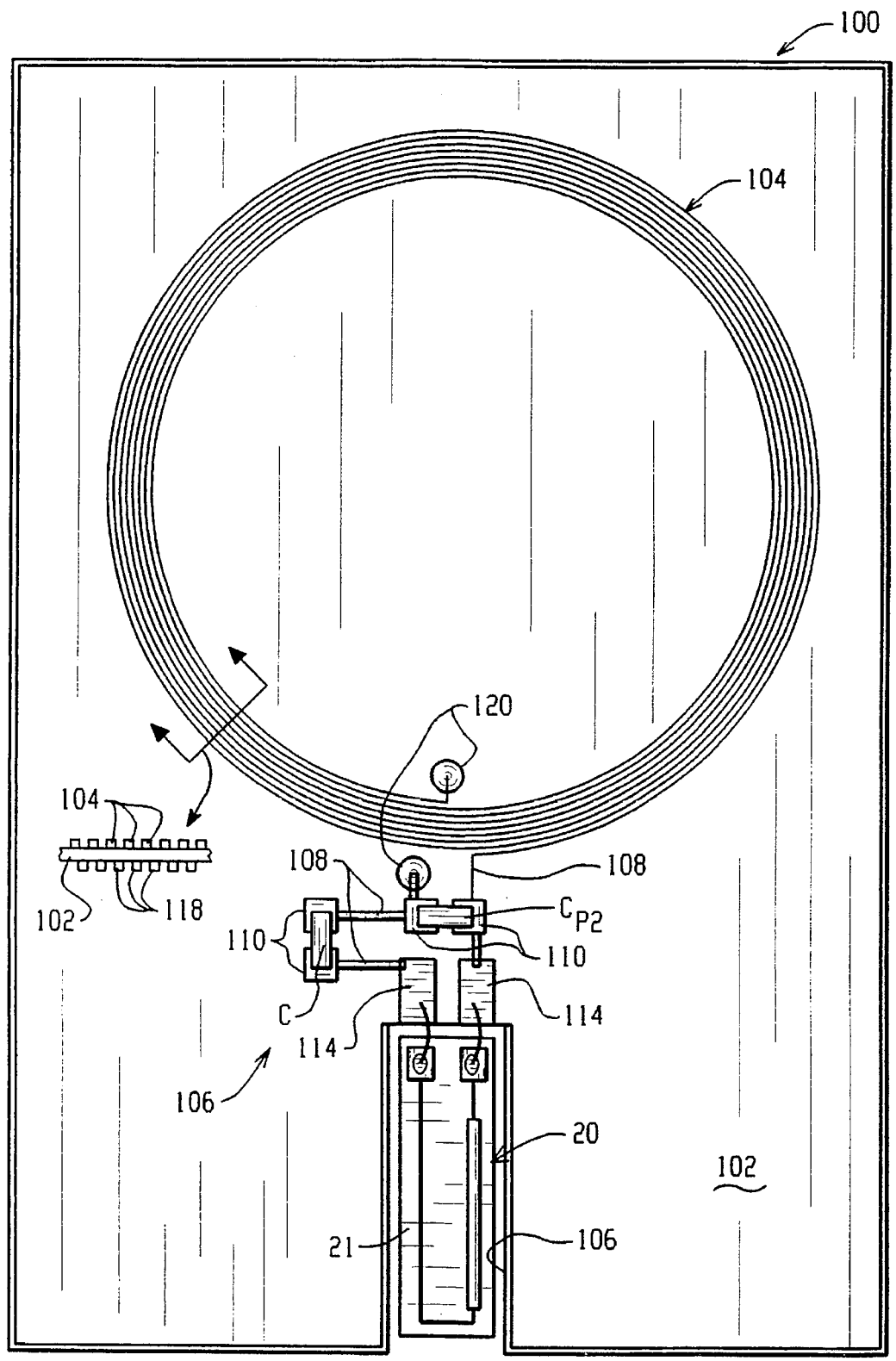
FIG. 5 is a top plan view of an embeddable sensing device according to the present invention including a portion shown in enlarged cross-section.
Figure 6:
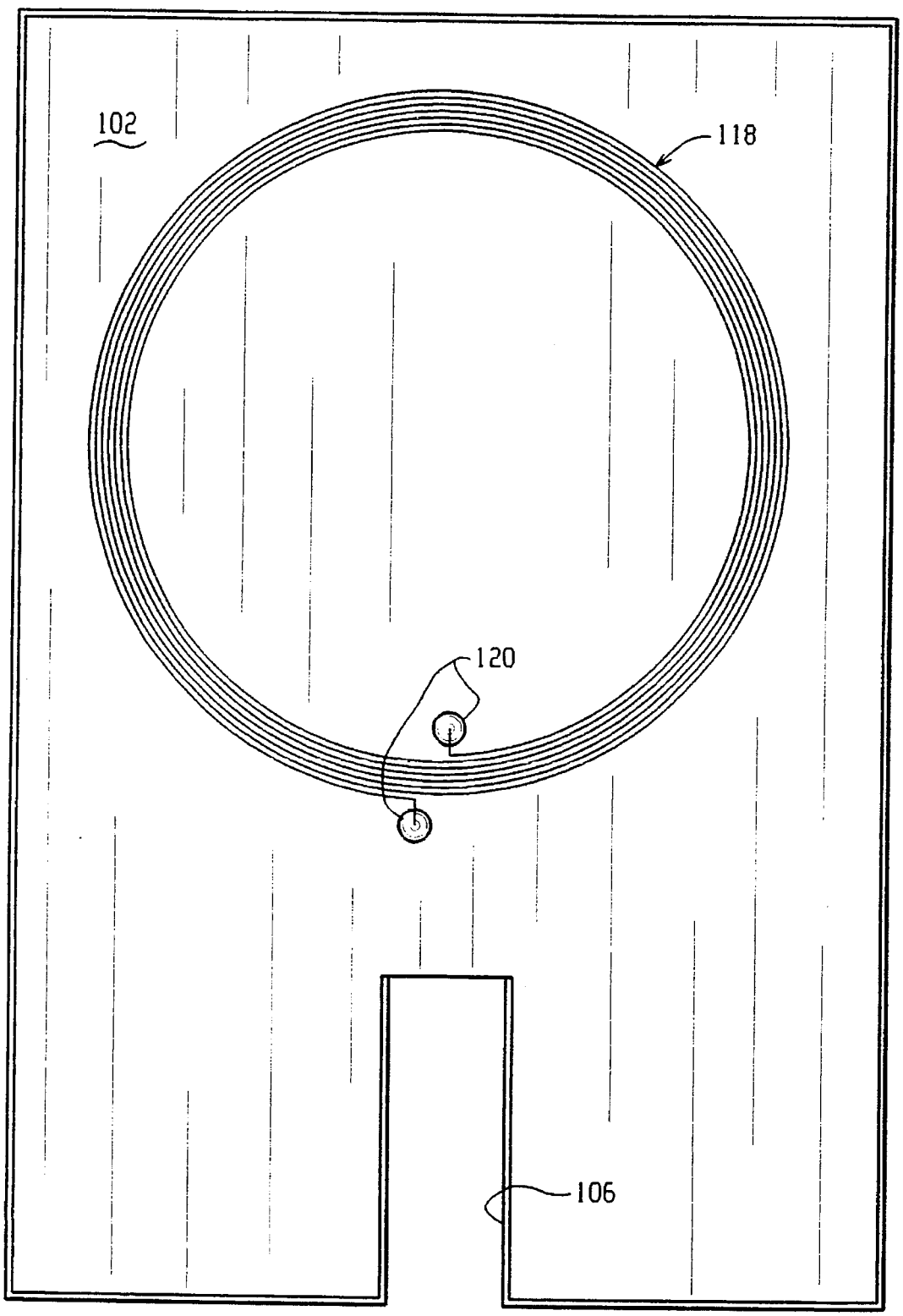
FIG. 6 is an opposite side plan view of the device of FIG. 5.

In accordance with an important aspect of the invention, the sense circuit 22 components are integrated on a substrate such that the entire sensing circuit 22 can be embedded in or integrated with a structure in order to access easily the sensor(s) to be interrogated, as fully described herein with reference to FIGS. 5 and 6.

The sense coil 14 is preferably embedded in the structure at a known location so that the interrogation coil 12 can be positioned in close proximity thereto to achieve good magnetic coupling between the coils. For example, the coil 12 could be embedded in a conformal structure that can be placed over the structure S. A suitable arrangement for such alignment is disclosed in the above-referenced co-pending U.S. patent application Ser. No. 981,966. As illustrated in FIG. 1, typically the sense coil 14 and interrogation coil 12 will be separated by a gap 30. This gap often will include the structural material involved in the sensor 20 analysis, or could simply be air or other non-magnetic medium, for example, in the case of surface mounted coils and sensors.

The gap 30 defines a distance "x" that separates the interrogation coil 12 from the sense coil 14. This distance affects the quality of the magnetic coupling between the coils and consequently affects the ability to detect the condition of the sensor and to couple the sensor data from the structure to an analyzer. According to an important aspect of the invention, the gap x can be determined for each interrogation of the sensor, even on a real time basis, in order for the output signals to be adjusted or compensated for the particular gap distance existing at the time of the interrogation. This is a substantial advance over prior known systems because the ability to compensate for the gap permits the use of amplitude variant signals for accessing the sensor output from the structure, rather than frequency variant signals. Thus, the invention has significant benefits for use with optical sensors because many optical sensors produce outputs wherein the sensor data is encoded in light signals that are amplitude or intensity variant.

The interrogation or exciter coil 12 is part of an interrogation circuit 40 that includes: a variable frequency energy source 42 which may, for example, be a voltage controlled oscillator (sinusoidal or other suitable application specific wave form); a load or sensing resistor 44 (sometimes identified herein as $R_{44}$); a signal conditioning circuit 46; and a data processing and control circuit 48 that produces an output 50 that corresponds to the sensor output or condition, and produces a control signal on line 52 for controlling the frequency and the magnitude of the excitation signal that the oscillator 42 applies to the interrogation coil 12. The exciter coil 12, sensing resistor 44 and source 42 provide a resonant exciter circuit 36 that is used to induce currents in the sense coil 14 by magnetic coupling between the coils 12, 14.

The basic operation of the exemplary apparatus 10 of FIG. 1 according to the invention is as follows. The sensing circuit 22 exhibits a resonant frequency ($f_s$ in FIG. 3) which we define as the frequency which is the point of maximum sensitivity to changes in $I_P$ for a given change in $R_{STRAIN}$ (maximum for $\Delta I_P/\Delta R_{STRAIN}$.) The resonant frequency $f_s$ is determined by the sum total of the reactive elements of the circuit which includes the inductance of the sense coil 14 and the interrogation coil 12, as well as the capacitance 24 (and parasitic capacitances $C_{P1}$ and $C_{P2}$ shown in FIG. 2) and the value of K. The amplitude of the current through the coil 14 is also a function of the sensor dependent element 20, particularly at the resonant frequency of the sensing circuit 22. When the exciter coil 12 has an AC signal applied, current in the exciter or primary coil 12 induces current in the secondary or sense coil 14, as in an air gap transformer. This current in the sense coil, however, is reflected back to the exciter coil 12 by the mutual coupling of the two coils. The sense resistor 44 is used to detect the current in the exciter coil 12. When the excitation frequency is approximately at the resonant frequency of the sensing circuit 22, the current in the exciter coil changes maximally in relation to the value of the sensor dependent element 20. Thus, the sensor condition can be determined as a function of the detected current in the exciter coil. The signal conditioning circuit 46 is used to amplify the voltage developed across the sense resistor 44 by the exciter circuit current. This amplified voltage is then rectified and low pass filtered to provide a DC voltage output. The control circuit 48 then uses the DC value to determine the state or output of the sensor 20.

As noted herein, the amplitude of the current that flows in the coils is dependent on the value of the sensor dependent element 20. The coil currents, however, are also strongly a function of the size and characteristics of the gap 30. This is because the gap, and the medium in the gap, between the coils proportionately affects the magnetic coupling between the two coils. For example, the coupling constant, K, between the coils is directly proportional to the inverse distance x. Therefore, the magnitude of currents induced in the coils is a function of the distance x. This has been one of the major reasons why amplitude based measurements have heretofore been impractical, because precise control of the gap 30 is difficult, and in fact near impossible when it is desired to have the external interrogation circuit movable between different sensor locations in a structure. In accordance then with an important aspect of the invention, the control circuit 48 is configured in a manner such as set forth hereinafter to characterize the gap 30 and thus accurately determine the sensor condition based on amplitude variant signals from the exciter circuit.

Figure 2:
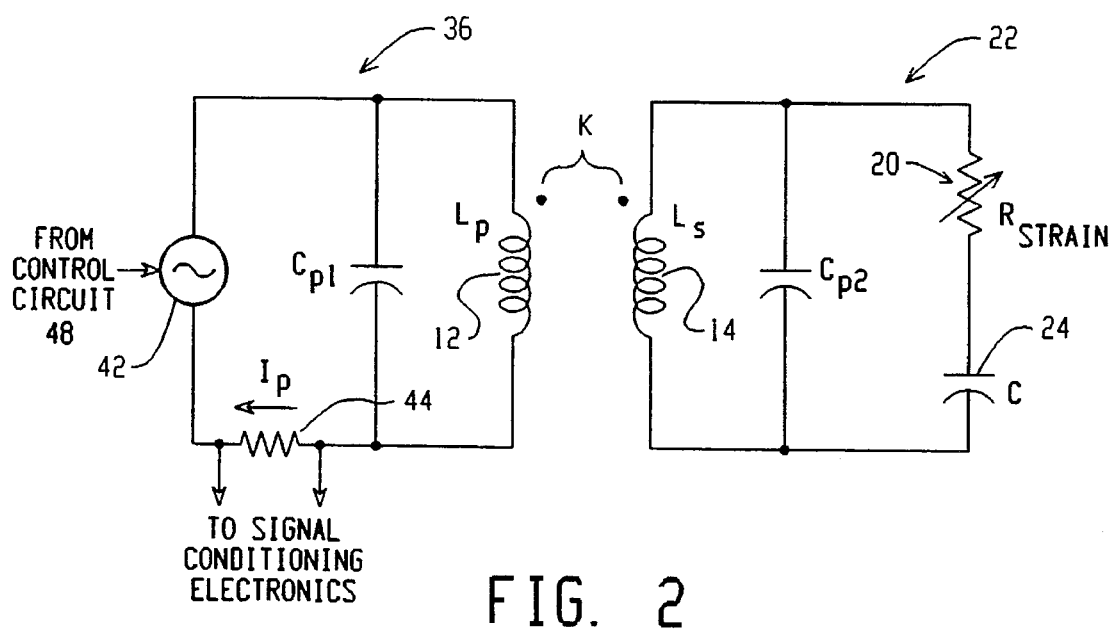
FIG. 2 is a detailed electrical schematic diagram of a circuit such as used with the apparatus of FIG. 1 that can be used to interrogate a sensor embedded in or disposed on a structure.

With reference next to FIG. 2, we show a more detailed circuit model of an exciter circuit 36 and sensing circuit 22 useful in practicing the invention. As shown, the exciter circuit 36 includes the exciter coil 12 that has a determinable inductance, $L_P$. The coil 12 and associated components of the exciter circuit 36 also will exhibit an overall parasitic capacitance, $C_{P1}$, that appears in parallel with the coil inductance. The exciter circuit further includes the variable frequency oscillator 42 and the sensing resistor 44 used to sense the primary or excitation current $I_P$. Thus, all components in the exciter circuit 36 are known quantities for each application.

The resonant sensing circuit 22 includes the sense coil 14 which has a determinable inductance, $L_S$. The sense coil 14 also has an associated parasitic capacitance, which parasitic capacitance is in effect part of the capacitance $C_{P2}$ which is a discrete capacitor selected to optimize the sensitivity of the apparatus 10 to changes in the value of the element 20. In other words, the value of $C_{P2}$ can be selected, such as based on experimental data for specific circuits, to maximize the current $I_P$ induced in the exciter circuit 36 as a function of changes in the resistance $R_{STRAIN}$ (e.g. maximize the ratio $\Delta I_P/\Delta R_{STRAIN}$.) The sense circuit 22 also includes an additional discrete capacitor C which is selected to adjust the frequency at which the $\Delta I_P/\Delta R_{STRAIN}$ ratio is optimized. Thus, for the sense circuit 22, all of the component parameters are known quantities except the coupling constant, K, and the value of the sensor output (as represented by the unknown quantity $R_{STRAIN}$ in the specific example of the described embodiment, but more generally the value of the sensor dependent element 20).

Figure 3:
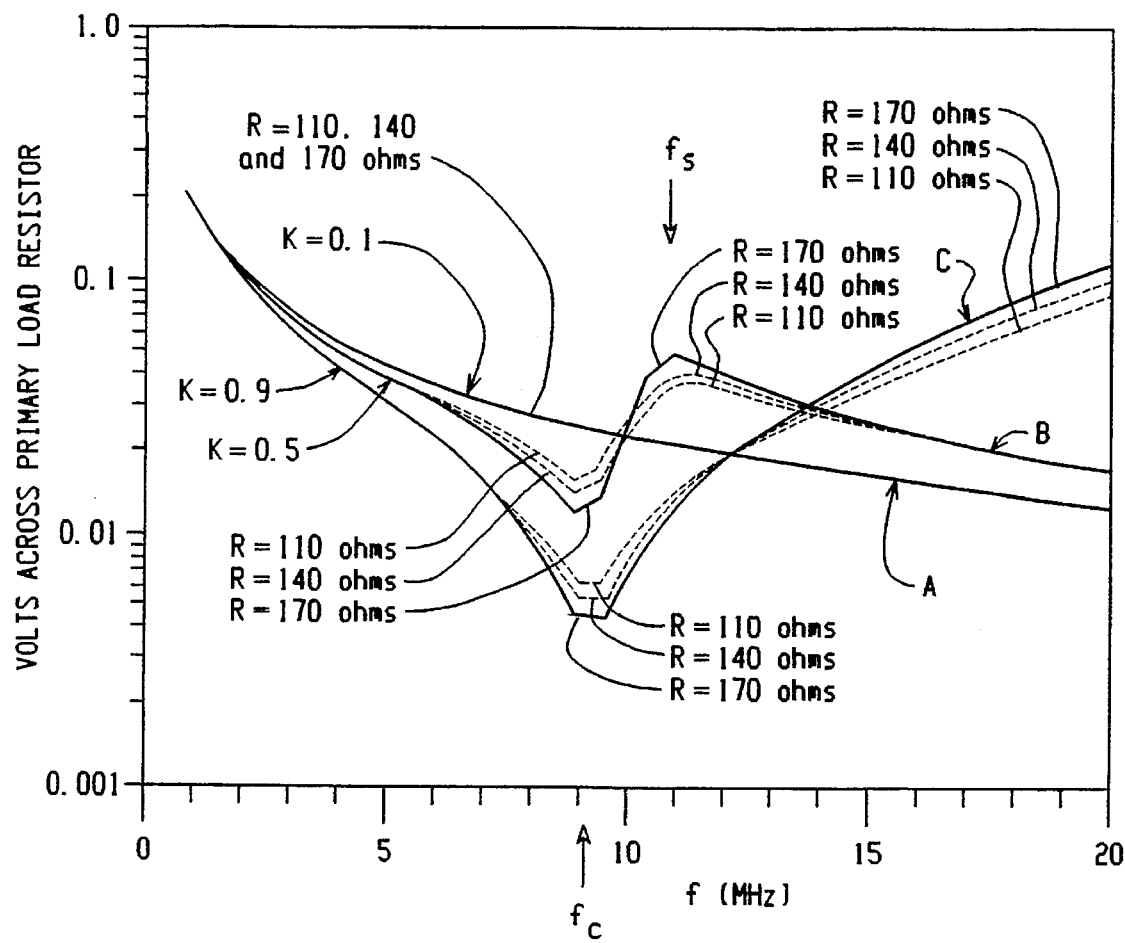
FIG. 3 is a representative graph of primary current (as detected by voltage across a sense resistor) vs. excitation frequency for the circuit of FIG. 2.

FIG. 3 is a graph showing in a representative manner a typical frequency response characteristic of the circuit of FIG. 2, as shown by the family of curves determined by monitoring the primary current $I_P$ vs. excitation frequency for different K values (in this example for K=0.1, K=0.5 and K=0.9) and different resistance values for the sensor dependent element 20. Note that the Y-axis is a logarithmic scale. In this example, as in the system embodiment of FIG. 1, the current $I_P$ is detected as a voltage developed across the sense resistor 44, with this voltage being rectified to a DC value.

Several important attributes of the circuit should be noted. Graph A corresponds to the frequency response for K=0.1, which may, for example, correspond to a rather large gap (high value of "x" on the order of approximately ½ the coil diameter) with reduced magnetic coupling between the coils 12, 14. Virtually no sensitivity is present to different values of the element 20. In other words, regardless of the excitation frequency, the current in the exciter circuit 36 is not a detectable function of the value of the element 20. It will further be noted that as excitation frequency increases, the current $I_P$ initially decreases, indicative of the exciter circuit 36 resonant impedance; however, if the frequency sweep were extended beyond 20 MHz (not shown in FIG. 3), the current $I_P$ would reach a minimum at the resonant frequency of the $L_P C_{P1}$ circuit and then increase to a maximum value approximately equal to $V_{42}/R_{44}$ (the source voltage divided by the sense resistor.)

Graph B corresponds to the frequency response for K=0.5, which may, for example, correspond to a moderate gap (intermediate value of "x" on the order of approximately 1/10 the coil diameter) with somewhat reduced magnetic coupling between the coils 12, 14. First note that at a frequency generally designated $f_c$, the circuit exhibits some sensitivity to the value of the resistance of the element 20. This occurs, for example, around 9–10 MHz. At higher frequencies, for example, at the frequency generally designated $f_s$, the circuit exhibits substantially increased sensitivity to the value of the element 20, for example, around 11 MHz. Further note that at lower frequencies, for example around 5 MHz, the frequency response is again independent of the value of the resistance of element 20. The frequency $f_c$ can be approximated by the formula $1/(2\pi * \text{SQRT}(L_S [C_{P2}+C]))$.

Graph C corresponds to the frequency response for K=0.9, which may, for example, correspond to a small gap (short value of "x" on the order of less than 1/10 the coil diameter) with a high degree of magnetic coupling between the coils 12, 14. First note that at approximately the same frequency generally designated $f_c$, the circuit exhibits some sensitivity to the value of the resistance of the element 20, and a greater sensitivity than when K=0.5. At higher frequencies the circuit again exhibits substantially increased sensitivity to the value of the element 20, for example, at a frequency generally around 20 MHz. Further note that at lower frequencies, for example around 5 MHz, the frequency response is again independent of the value of the resistance of element 20.

Also it should be noted that at the lower frequency range, such as at 5 MHz, the voltage detected across the sense resistor 20 is dependent on the value of K, but independent of the value of the resistance 20. Therefore, the value of K can be determined by applying a first excitation frequency, such as 5 MHz, to the exciter coil 12, and detecting the resultant current $I_P$. Having determined the value of K, the value of the element 20 can be determined by applying a second excitation signal at a frequency and magnitude range wherein the circuit is known to exhibit maximum sensitivity to the value of the element 20. The second frequency can be selected in at least two ways. First, as shown in FIG. 3, the frequency $f_c$ is not strongly dependent on the value of K. Therefore, the first and second excitation frequencies can simply be fixed values based on the particular circuit components used in an application. Alternatively, sensitivity and accuracy can be increased by adaptively selecting the second frequency based on the determined value of K (from the measurement made at the first excitation frequency.) That is, the second frequency can be selected so that it corresponds to a circuit response at which the current $I_P$ is more strongly dependent on the value of the element 20. As is clear from FIG. 3, however, the value of this second frequency depends on the value of K. Therefore, the control circuit 48 is configured to determine adaptively the correct value of the second excitation frequency for each possible value of K.

A mathematical model of the circuit of FIG. 2 can be derived from fundamental circuit theory:

$$I_p = \frac{V_{sig}}{Z_p + j\omega L_p + \left[\frac{\omega^2 K^2 L_p L_s}{Z_s + j\omega L_s}\right]} \quad \text{Eq. 1}$$

where:

$$V_{sig} = \frac{j\omega V_s C_{p1}}{1 + [j\omega C_{p1} R_{44}]} = \frac{V_s Z_p}{R_{44}}$$

-continued $$Z_s = \frac{R_{STRAIN} + 1/j\omega C}{(1 + C_{p2}/C + j\omega R_{STRAIN})}$$

$$Z_p = \frac{j\omega C_{p1} R_{44}}{1 + j\omega C_{p1} R_{44}}$$

The only quantities in equation 1 that are unknown after the circuit components have been selected are K and $R_{STRAIN}$. Thus, if two measurements of $I_P$ are made at two different frequencies with one frequency being selected so that $I_P$ is independent of the value of $R_{STRAIN}$, and the other frequency selected so that $I_P$ is dependent on the value of $R_{STRAIN}$, then both unknown quantities can be determined.

With reference again to FIG. 1, it is now apparent that the control circuit 48 is configured to determine first the value of K by applying a first frequency to the exciter coil 12, and detecting the resultant voltage produced across the sense resistor 44. This voltage then indicates the value of K, from which the control circuit 48, for the adaptive processing method, selects a second frequency to apply to the exciter circuit such that the resultant voltage measured across the sense resistor corresponds to the value of the element 20.

A particular advantage of the invention is that an embedded sensor can be energized, interrogated and the sensor information coupled in a contactless manner to a processing circuit through the use of a single coil pair.

The control circuit 48 can be realized in the form of a microprocessor or similar controller that accesses data stored in memory based on circuit characterization data and look up tables so as to determine the values of K and $R_{STRAIN}$ and produce a corresponding output 50. This can be accomplished in a conventional data processing manner for extrapolating data based on empirically derived characterization values. For example, the specific circuit used for an application can be characterized based on actual frequency response data for different values of K and the element 20. This data can then be stored in look up tables for processing by the control unit 48. Although this approach may be feasible for some applications, other more complicated applications may require an extensive amount of test data to sufficiently characterize the circuit so that accurate values of K and the element 20 can be determined. This extensive data also requires large amounts of memory for access by the control circuit 48.

In accordance with another important aspect of the invention then, we have found that neural net processing can be used to implement either or both of the processing methods described above, i.e. the determination of K and $R_{STRAIN}$ based on optimized selections of the first and second excitation frequencies, or the adaptive processing technique in which the second excitation frequency is selected as a function of the value of K. We have further found that while the values of K and $R_{STRAIN}$ can be determined with good accuracy, we can substantially improve accuracy by using neural processing to calculate directly the values of "x" and strain, $\epsilon$. Of course, this is only an exemplary description. Strain is just one of many parameters that can be determined, and as previously described the element 20 can be used as a transducer to convert optical sensor output signals into resistance variations that can be determined by the neural processing. For convenience we will continue with the example of using the concepts of the invention for strain measurement, but such example is not to be construed in a limiting sense.

Figure 4:
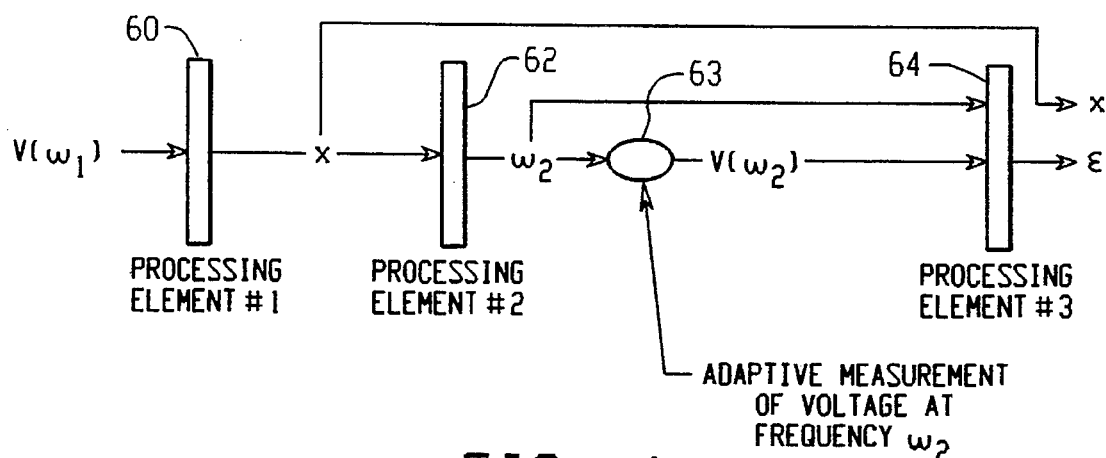
FIG. 4 is a block diagram of a neural net processing circuit that can be used with the sensor interrogation circuit of FIGS. 1 and 2.

With reference to FIG. 4, a suitable architecture is illustrated for a neural net processing methodology to determine the values of "x" and strain, ε, or alternatively the values of K and $R_{STRAIN}$. Basically, the neural net includes three subnets identified 60, 62 and 64. The first subnet 60 is used to determine the value of "x" based on the voltage reading across the sense resistor 44 at a first excitation frequency, $\omega_1$ The second subnet 62 is used to determine the optimal value of the second frequency, $\omega_2$, about which the circuit exhibits maximum sensitivity to the changes in the element 20. An adaptive measurement at 63 is used to select an appropriate excitation voltage at frequency $\omega_2$ (for the source 42.) The magnitude is selected so that the signal processing is operated full range to provide maximum output signal at the minimum value of $R_{STRAIN}$. The selection of the excitation signal magnitude can be conveniently incorporated into the neural network training process. The third subnet 64 is used to determine the value of the sensor output (in this case strain) as a function of the voltage measured when the second excitation frequency is applied.

The neural nets are developed and trained in a conventional manner. Data is collected for the circuit frequency response across a selected frequency range while changing the values of "x" and strain in a known manner. This data is then used to train the neural nets. Accuracies of better than 1% have been achieved.

The neural nets used were generated following their detailed description in "Structure-unknown non-linear dynamic systems: identification through neural networks" by S. F. Masri, A. G. Chassiakos and T. K. Caughey in *Journal of Smart Materials and Structures*, Vol. 1., No. 1 pgs. 45–56. The nets utilized a single input which was preprocessed into components of an orthogonal polynomial basis set, i.e., $X \to X, X^2, X^3, \ldots, X^8$ so that 8 neurons comprised the fan out layer The nets had two hidden layers having 10 neurons each and an output layer having one or two neurons depending upon requirements. The neurons utilized signoid activation functions. A listing of a training algorithm for one of the nets having a single output neuron is appended hereto. The algorithm is written in the Microsoft Quickbasic® computer language.

With reference now to FIGS. 5 and 6, we show an exemplary embodiment of a sensing device 100 according to the present invention that can be integrated with or embedded in a smart structure for interrogating an embedded sensor. In the described embodiment, the sensing device 100 integrates the components that are part of the sensing circuit 22 in FIGS. 1 and 2.

With reference to FIG. 5 then, the sensing device 100 includes a substrate 102. In this embodiment of the invention, the substrate 102 is a thin, flexible coupon of insulative material. For example, we have found 0.01 inch thick kapton® to be a suitable material, but this is only one of many possibilities. The dimensions of the coupon will be determined in part by the size of the coil used in the sensing circuit 22, as well as the number and type of components integrated into the sensing device 100.

A coil 104, corresponding for example to the sense coil 14 in the sensing circuit 22, is integrally disposed on the substrate 102. The coil 104 is formed on the substrate 102 by a preferred method of copper etching. The substrate 102 initially is provided with a copper lamination, such as 0.0007 inch thick copper (½ ounce copper.) A mask, such as used in conventional photomasking processes, is then be used to pattern a photoresist layer on the copper laminated substrate. A suitable etchant is then applied to remove the copper other than the desired circuit pattern. In the described example, the circuit pattern 106 includes the coil 104 and a plurality of interconnecting lines 108 and a plurality of contact pads 110. The pads and leads are used to interconnect the coil 104 and the other components of the sensing circuit 22. According to an important aspect of the invention, components such as the capacitors C and $C_{P2}$ can be surface mounted on the substrate 102 with their respective leads connected to the pads 110. Such an arrangement is shown for example at 112 whereat a capacitor C is surface mounted on the substrate 102 with leads connected to the pads 110.

The circuit pattern 106 may further be provided with contact pads 114 used for making electrical connection to a sensor. In the exemplary embodiment described herein, the sensor is a semiconductor strain gauge which can be mounted on a substrate 21 (such as plexiglass for example) for determining resistance of the gauge as a function of strain or stress applied thereto. Thus, the strain gauge is embedded in or on the structure to be monitored. The substrate 102 can be conveniently configured with a cutout 106. The strain gauge can then be disposed in the structure within the cutout 106 proximate the sensing device 100 and connected thereto by short wires connected to the lands 114. Of course, the sensing device does not need to be positioned near the sensor, but in fact could be remotely located and connected thereto by suitable means depending on the type of sensor involved. In this case, the resistive strain gauge can be connected by electrical leads. In the case of a sensor that produces an optical output, the sensor may be connected to the device 100, for example, by optic fibers that direct electromagnetic energy onto a photoresistor that is surface mounted on the substrate 102. In another example, the sensor itself could also be surface mounted on the substrate 102, such as for example in the case of a temperature sensor. Thus it is apparent that the invention is not to be construed in a limiting sense as to the type of sensor used, or the number of sensors, or the particular circuitry used as part of the sensing circuit 22. Many possible applications and uses preclude listing all the options available. An important aspect of the invention is that the sensing device 100 can be embedded if desired with the sensor(s) and integrally provides the means for interrogating the sensor and transmitting sensor information back out from the structure via the coil 104.

As previously explained herein, the sense coil 14 is magnetically coupled to the excitation coil 12. Typically, the excitation coil 12 will be provided outside the structure being monitored so that the sensor data can be collected and analyzed. Thus, in accordance with the invention, the exciter circuit (including pads for connecting the exciter circuit to the variable frequency source 42) can also be integrated onto a second substrate having circuit patterns and surface mounted components thereon in a manner similar to the sensing circuit 22. For example, the capacitor $C_{P1}$ and the sense resistor 44 can be surface mounted on the second substrate along with the exciter coil 12. The basic concepts for forming the two substrate mounted circuits are the same therefore a detailed explanation and drawing of the integrated exciter circuit is not repeated herein. Conveniently, the exciter circuit can also be embeddable into a conformal structure that is overlayed with the sensing device 100 to achieve good magnetic coupling between the coils 12, 14. The coils 12, 14 however do not need to be in direct contact with each other.

We have found that good magnetic coupling between the coils 12, 14 can be achieved when each coil is patterned in a tightly spiraled circles. This coil pattern produces a doughnut shaped magnetic flux field with good flux linkage between the coils. Performance can be further improved by doubling the coil turns. This can conveniently be accomplished, for example for the sense coil 14, by disposing half of the turns on one side of the substrate 102, and disposing the other half of the turns on the opposite side of the substrate (see the cross-sectional enlargement in FIG. 5.) The coil halves preferably are concentric with each other and of course electrically connected. For example, in FIG. 6 we show in an exemplary way the opposite side of the substrate 102 (with the strain gauge omitted for clarity). A second etched coil 118 is disposed thereon and that closely conforms with the coil pattern on the opposite side. Vias 120 are provided to electrically interconnect the coil halves. An advantage of forming the sense coil in two halves on opposite sides of the substrate is that the number of turns can be doubled without using an undesirable wide coil area. In other words, since the coils are spiral shaped, simply increasing the number of turns would result in the inner turns being spaced from the outer turns which effectively reduces the ability of the coils to produce concentrated magnetic fields and would reduce magnetic coupling between the coils 12 and 14 possibly to unusable levels. Therefore, in some applications it will be advantageous to provide double sided etched coil halves. Of course, additional surface mounted components can be disposed on both sides of the substrate 102 (not shown.)

The exciter coil 12 can also be formed in two connected halves on opposite sides of the respective substrate used for the exciter circuit 36.

The sensing device 100 can thus be made quite small and easily embedded or otherwise integrated with a composite structure without affecting structural integrity, and conveniently be used for supplying energy to the sensor, interrogating the sensor, and coupling sensor information back out of the structure through a contactless coupling with the exciter circuit. In addition to passive components such as resistors, capacitors and coils, active components such as for example transistors, diodes and integrated circuits can be surface mounted on the substrate for more advanced signal processing and data control within the smart structure.

Figure 7:
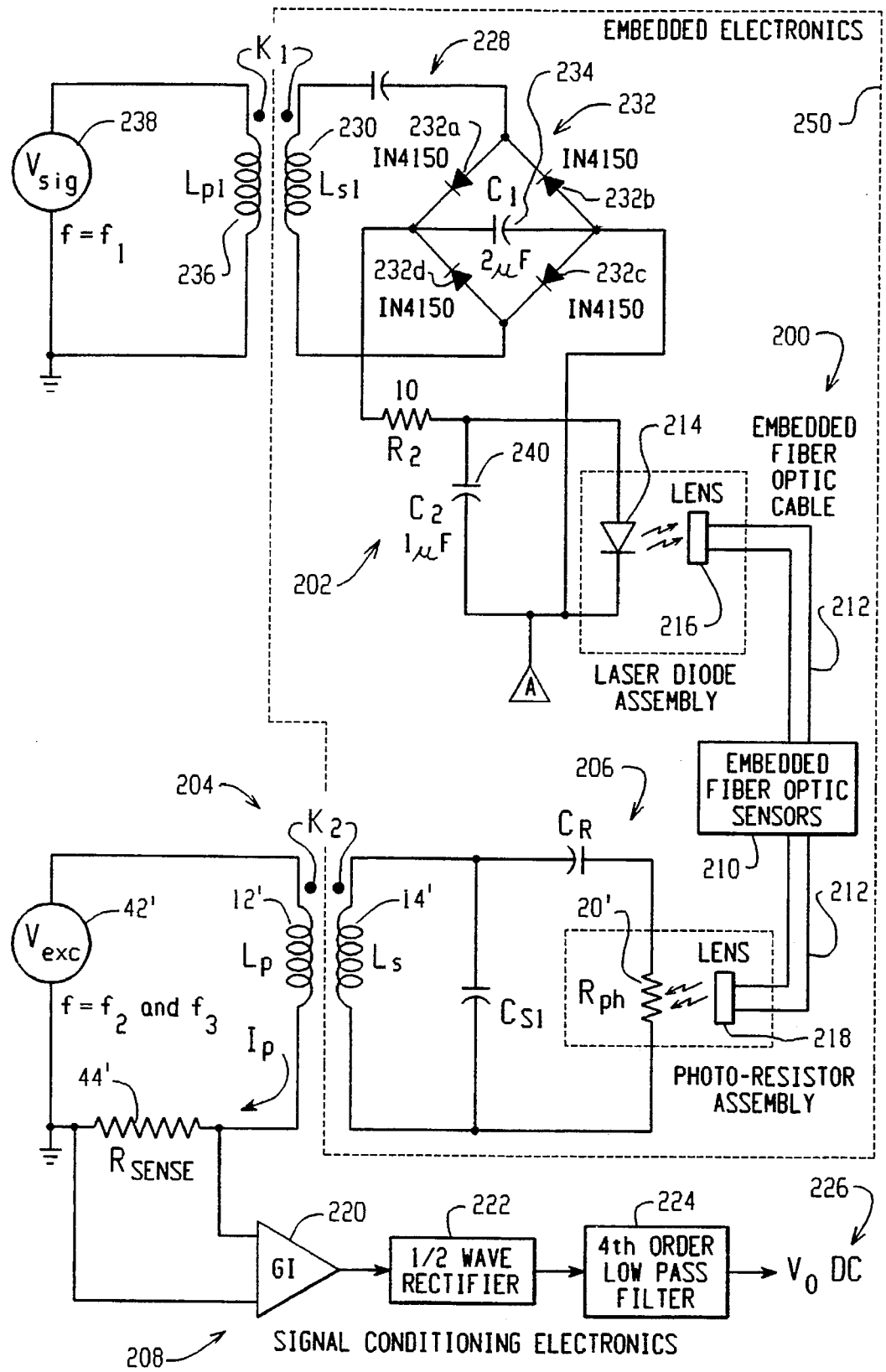
FIG. 7 is a diagrammatic representation of a smart structure embodiment of the present invention.

With reference next to FIG. 7, we illustrate an example of a smart structure arrangement that incorporates the various aspects of the invention previously described herein, with additional features described below. For convenience, various components that correspond to components previously described with respect to FIGS. 1–6 are given like numerals followed by a prime ('). In this example, the smart structure includes a sensor apparatus 200 which may include one or more sensors integrated with or embedded in the structure (not shown in FIG. 7.) In accordance with a significant advantage of the invention, the sensor 200 is energized by a power source 202. The power source 202 is also capable of being integrated with the structure to provide contactless energization of the sensor 200. The smart structure further includes a detector circuit 204 for interrogating the sensor 200 and coupling sensor information out of the structure to an external processing circuit (such as the control circuit 48 in FIG. 1.) The detector circuit 204 includes a sensing circuit 206 which is also preferably embeddable in the structure, in a manner similar to the device described herein with respect to FIGS. 5 and 6. The external circuitry includes signal conditioning electronics 208 which may conveniently operate in a manner similar to the above described conditioning electronics 46 of FIG. 1.

In the embodiment of FIG. 7, the sensor 200 is an optics based sensor, such as an optic fiber sensor 210 that detects a physical parameter of the structure such as stress and strain by modulating light energy transmitted through optic fibers 212. Such a sensor is fully described in U.S. Pat. No. 4,863,270 issued to Spillman and commonly owned by the assignee of the present invention, the entire disclosure of which is fully incorporated herein by reference. The sensor 200 also includes a light source 214 such as a laser diode. Another significant improvement of the present invention is that the source 214 can be embedded in the structure and energized by the integrated power supply 202. An optional lens 216 is provided to focus and collimate the light energy emitted by the diode 214 into the optic fiber 212. A second optional lens 218 is used to concentrate the output light from the sensor 200 onto a sensor dependent element 20' which in this case is a photosensitive resistor having a resistance that depends on the intensity of light incident thereon. The resistor 20' is incorporated into the sensing circuit 22' having a sense coil 14' and capacitors $C_{S1}$ and $C_R$ which can be selected in a manner similar to the capacitors C and $C_{P2}$ described with respect to FIGS. 1 and 2. The sensing circuit components can conveniently be integrated onto a substrate with the coil 14' and connecting leads in a manner similar to the device of FIGS. 5 and 6.

The sensing circuit 22' is, of course, magnetically coupled to an exciter circuit 36' that includes an exciter coil 12' connectable to a variable frequency source 42', and a sense resistor 44' used to detect the exciter current $I_P$. For clarity, the parasitic capacitance $C_{P2}$ has been omitted from the exciter circuit 36' (see FIG. 2) although in practice it is present as described hereinbefore.

The signal conditioning electronics 208 includes a transconductance amplifier stage 220 that converts the current $I_P$ to a voltage that is rectified by a rectifier circuit 222 and then filtered by a filter circuit 224 to produce a DC output signal 226 that is used by a control circuit 48' (not shown in FIG. 7) in a manner similar to operation of the control circuit 48 in FIGS. 1 and 2. The control circuit 48' is configured to control the excitation frequencies applied to the exciter coil 12' so as to interrogate the condition of the resistor 20', and also to interpret the detected current $I_P$ so as to determine the sensor output. Operation of the control circuit 48' and the detector circuit 204 to interrogate the sensor 200 can conveniently be implemented using the adaptive processing approach previously described hereinabove using neural network processing for example. Therefore, the description of this operation is not repeated but can be referred to herein with respect to the discussion of FIGS. 1–4.

The power source 202 includes a receiver circuit 228 having a power coil 230 connected to a full wave bridge rectifier 232 that uses rectifying diodes 232a–d. A tuning capacitor 234 is connected across the rectifier 232 and is selected so that the resonant frequency of the receiver circuit 228 maximizes energy coupled between the power supply exciter coil 236 and the power coil 230. The power supply exciter coil 236 is connected to a high frequency energy source 238. The source 238 can be a single frequency oscillator tuned to the optimal frequency for coupling energy to the power coil 230 as determined by the resonant frequency of the receiver circuit 228 and the characteristics of the coupling constant $K_1$ at the gap between the exciter coil 236 and the power coil 230. Because the power supply circuit is only used for powering the sensor, the excitation frequency does not have to be dynamically adjusted for variations in the gap characteristics, so long as it is reasonably close to that frequency at which efficient energy transfer occurs across the gap. The source 238 may conveniently be integrated with the other external circuits of the apparatus such as the signal conditioning electronics 208, control circuit 48' and the detector circuit 204 excitation circuitry.

The power source 202 further includes a charge storage capacitor 240 that can conveniently be used to filter the DC energy produced from the rectifier 232. The capacitor 240 is connected to the light source 214 of the sensor 200.

In accordance with the various aforementioned aspects of the invention, the power source 202 components of the receiver circuit can be integrally disposed on a substrate for embeddment in the structure in a manner similar to the sensing device 206. All the embeddable components (as outlined by the box 250) including both receiver coils 230, 14' can, if desired, be disposed on a single substrate. The sensor 200 components such as the light source 214, and the sensor dependent element 20' can likewise be disposed on an embeddable substrate. Thus, the smart structure illustrated in FIG. 7 can be, if desired, integrally embedded power source and interrogation circuits magnetically coupled to external circuits which include the exciter circuit 36' the power exciter circuit 236, 238, the signal conditioning electronics 208 and a control circuit 48'.

Operation of the exemplary smart structure as shown and described in FIG. 7 is straightforward. The exciter coils 236, 12' are concentrically overlayed (such as, for example, using a conformal structure) and the source 238 operated at a frequency $f_1$ at which energy is coupled to the power coil 230. Current generated in the coil 230 is rectified to provide a DC power supply to the light source of the sensor 202. The sensor 202 detects the structural parameters of interest and produces a modulated light output that is detected by the photosensitive resistor 20'. The control circuit 48' applies two frequencies $f_2$ and $f_3$ to the exciter coil 12', which frequencies can be predetermined or adaptively determined. Neural processing can advantageously be used for selecting the frequencies and determining the sensor output as a function of the resistor 20' and current $I_P$ as described hereinbefore. Clearly, the invention described herein is not to be construed in a narrow sense based on the specific embodiment of FIG. 7. Optic sensors are but one choice for example. A significant advantage of the invention is that it provides means for powering and interrogating an embedded sensor through a contactless coupling, even for sensors that produce amplitude or intensity dependent or resistance detected outputs.

Figure 8:
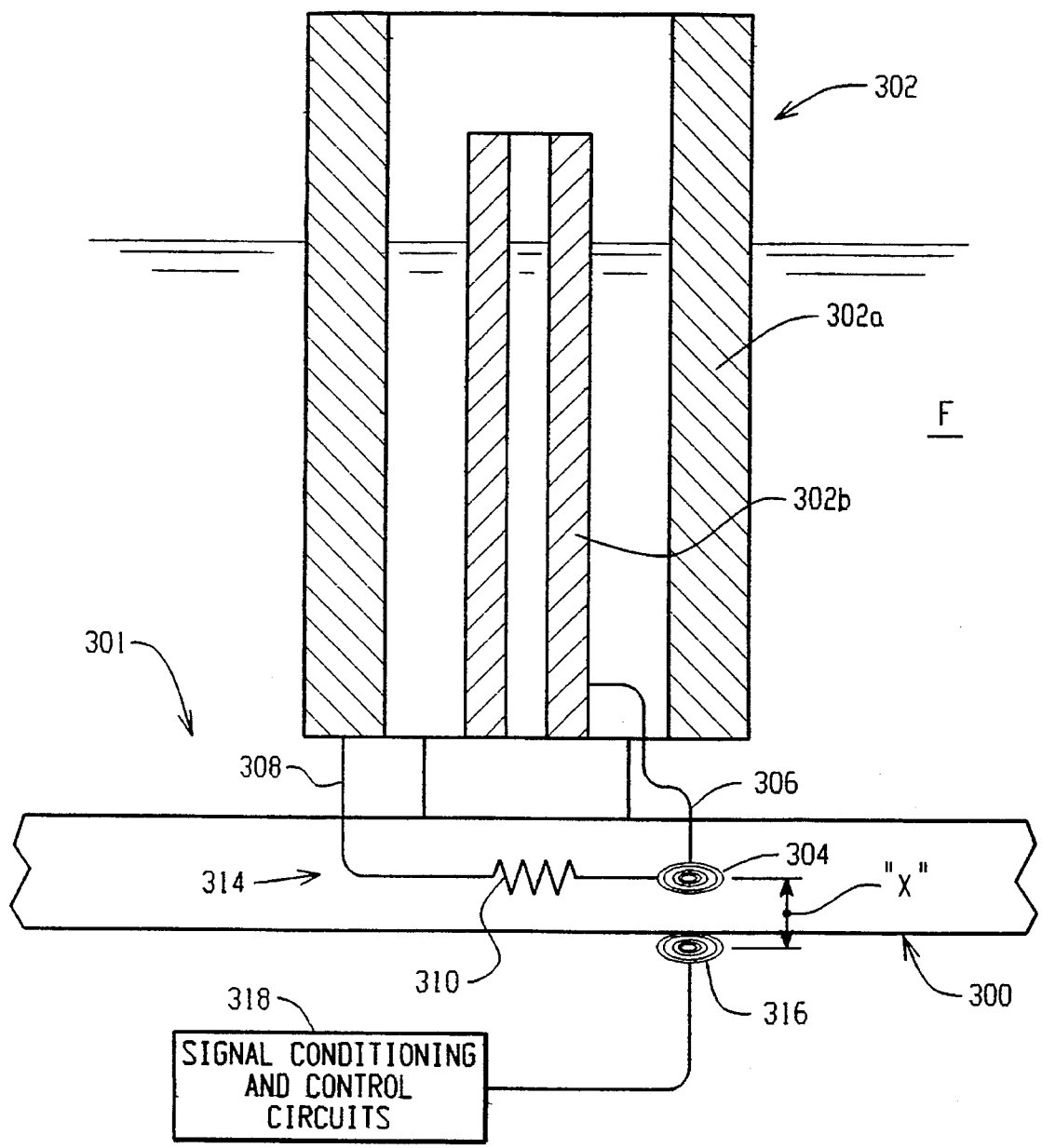
FIG. 8 is a diagrammatic representation of a fluid gauging apparatus that uses capacitive sensors and that can be inductively interrogated using the concepts of the invention such as embodied in FIGS. 1–7.

With reference next to FIG. 8, there is illustrated in schematic form an apparatus 301 for inductively interrogating a fluid quantity sensor disposed inside a tank or container. In this example, the container is a fuel tank for an aircraft, although any fluid container made of non-magnetic materials can be accomodated. The container can be defined by a structural wall 300 (partially shown in FIG. 8) that is made of a suitable material compatible with the fluid F contained therein. For example, the wall 300 can be made of composite materials such as a carbon epoxy matrix.

In the described embodiment, there is provided a sensor probe 302 that is used to detect a characteristic of the fluid related to the quantity of fluid in the tank. For example, the probe 302 can be a conventional capacitive fluid level detector, well known to those skilled in the art. Such a probe exhibits a capacitance value that varies with the level of the fluid in the tank, such as, for example, due to the different dielectric constants for air (uncovered portions of the probe) and the fuel (covered portions of the probe). In a typical design, the probe includes a pair of cylindrical and coaxially disposed tubes 302a and 302b such that the capacitance varies with the level of the fuel between the tubes. Other probe designs can be used for detecting the fluid level, including probe designs that use a variable parameter other than capacitance. For example, the previously described embodiments herein can be used to inductively interrogate a liquid sensor that produces a resistance change in relation to fuel level. Other variations and alternatives will readily be apparent to those skilled in the art. Furthermore, the invention is not limited to the use of fluid level sensors. Alternatively, for example, the sensor could be a pressure sensor (with a variable capacitance or resistance, for example) used to determine fluid volume based on the pressure or force exerted by the fluid. Such techniques are also well known to those skilled in the art. Thus, in a general sense, the invention can be realized with the use of any sensor that produces or causes a detectable electrical parameter change, such as capacitance, that is related to or based on the quantity, level, volume or mass of fluid in a container.

The capacitance plates 302a, b are connected to an antenna 304 that can be, for example, a coil similar to the coil 104 in FIG. 5. The antenna 304 is connected to the capacitance probe 302 by a pair of leads 306, 308. A resistance 310 is illustrated in the drawing, and this can represent a discrete resistor used for biasing, or the inherent resistance of the coil and leads. In either case, the capacitance 302, coil 304 (having an inductance $L_s$) and the resistance 310 form a resonant circuit 314 similar to the sensing circuit 22 in the earlier described embodiments (for clarity, parasitic capacitances and inductances have been omitted from FIG. 8 but can be taken into consideration when selecting actual component values).

In this case, the resonant circuit 314 will have a resonant frequency that is a function of the coil inductance and the capacitance of the probe 302. The coil 304 can be embedded in the tank wall 300 or disposed along the inner surface thereof. The coil can be integrated with surface mounted components on a substrate as an embeddable device similar to the embodiments described hereinbefore. In such an arrangement, the coil 304 can be disposed on or in the container wall so as to maintain the overall structural integrity thereof.

An excitation coil or antenna 316 is disposed on an exterior surface of the tank wall 300. In this embodiment, the excitation coil 316 is similar in shape to the first coil 304 and preferably juxtaposed coaxially therewith. In this manner, the antenna coils 304, 316 can be magnetically coupled across a coreless gap "X". By "coreless" is simply meant that there is no magnetic core linking the two coils. In many cases, such as the one illustrated in FIG. 8, the gap may be defined by the tank wall portion that separates the two coils.

The excitation coil 316 is connected with signal conditioning and control circuits 318. These circuits are used to apply excitation signals to the second coil 316, as well as to sense the coil second current in order to determine the probe capacitance and from that information determine the quantity of fluid in the container. The circuits 318 may be part of an overall fluid quantity management system, such as are typically used in aircraft applications, or can be a separate circuit arrangement that produces, for example, an output that is an indication of the probe capacitance.

The conditioning and control circuits described herein for the other embodiments of the invention can be conveniently used for the circuits 318 of FIG. 8. For example, the schematic representation of FIG. 2 can be generally applied to the electrical operation of the fuel gauging apparatus 301, with the exception that, in this exemplary embodiment, it would be the capacitance 24 (corresponding to the probe 302 capacitance) that would be the variable parameter of interest and not a variable resistance.

The capacitance of the probe 302, and hence the fluid quantity in the container, can be determined in a number of different ways using the circuits of FIGS. 1–6 described hereinbefore. For example, the control circuit 318 can include a variable frequency oscillator 42 that applies a frequency sweep excitation signal to the second coil 316. This frequency sweep can be centered around the expected resonant frequency of the circuit 314 based on a predictable range of values for the capacitive probe (from tank full to tank empty conditions). The resonant frequency can be easily identified then by a local minimum for the current $I_P$ as represented in FIG. 3 at frequency $f_c$.

Alternatively, for example, the capacitance of the probe 302 can be determined by applying two different excitation frequencies to the coil 316. The two frequencies are selected to be approximately centered around the expected resonant frequency of the resonant circuit 314. The first frequency is selected to be lower than the expected resonant frequency and the second frequency selected to be above the resonant frequency. Each of these excitation frequencies will produce a current in the load resistor (and hence a detectable voltage) that is a combination of the current produced in the primary circuit 36 and the current produced in the load or secondary circuit 22 (see FIG. 2). The secondary current levels will change in relation to the resonant frequency of the resonant circuit, which changes in relation to the capacitance 302. Thus, for example, a sum over difference calculation using the measured currents at the first and second frequencies will provide an accurate representation of the capacitance of the probe that is fully compensated for the quality of the magnetic coupling between the coils 304, 316. The signal processing can be carried out in a conventional manner based on selected characterization data, or alternatively through the use of neural net processing as explained herein. Because this embodiment of a fuel gauging apparatus utilizes resonant frequency shifts as the parameter of interest but is dependent on measured current amplitudes that are a function of the coupling between the two coils, the neural processing can be implemented with a single subnet that determines the optimal second excitation frequency based on the measured resistor 44 voltage at the first or reference frequency. In other words, the frequency sweep approach is relatively independent of the measured current/voltage levels in the load resistor 44 because the parameter of interest is the local minimum point for $I_P$ that occurs at $f_c$. In the second embodiment, while the sum over difference calculation will normalize variations in the two signal measurements, the selection of the second frequency can be optimized using the signal processing such as neural processing described herein, because the measurement at the first frequency will provide an indication of the quality of the mutual coupling between the coils 12, 14.

Note that a particular advantage of this fluid gauging apparatus is that electrical energy need not be directly connected into the tank interior. The probe 302 is fully energized and interrogated by the inductively coupled energy from the excitation coil 316.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. Gauging apparatus for fluid containers comprising: a capacitance disposed in the container that changes value based on the volume of fluid in the container; a first antenna disposed below an outer surface of the container and coupled to the capacitance to form a resonant circuit having a resonant frequency that is a function of the capacitance value; a second antenna magnetically coupled with the first antenna across a coreless gap; and a gauging circuit coupled to the second antenna and comprising an oscillator for applying an excitation signal at a number of different frequencies to the second antenna with the resonant circuit operating as a load for the gauging circuit with the load changing in relation to the capacitance value, and a signal processing circuit that detects said resonant frequency based on detecting current amplitude in the second antenna during application of said excitation signal and as a function of said load.

2. The apparatus of claim 1 wherein the capacitance comprises a capacitive fluid level sensor.

3. The apparatus of claim 1 wherein the capacitance comprises a capacitive pressure sensor.

4. The apparatus of claim 1 in combination with an aircraft fuel tank and disposed so as to gauge the fuel level and fuel quantity in the tank.

5. The apparatus of claim 4 wherein the fuel tank comprises composite material.

6. The apparatus of claim 1 wherein the gauging circuit comprises means for controlling a frequency sweep of the oscillator to detect the resonance frequency of said resonant circuit.

7. The apparatus of claim 1 wherein the gauging circuit includes a controller that temporally applies first and second frequency excitation signals to the second antenna and detects current through the second antenna.

8. The apparatus of claim 7 wherein said first frequency is selected below the expected resonant frequency of the resonant circuit.

9. The apparatus of claim 8 wherein said second frequency is selected above the expected resonant frequency of the resonant circuit.

10. The apparatus of claim 9 wherein said controller calculates a sum over difference value of the two measured currents caused by said first and second frequencies respectively, and further wherein said second frequency is selected based on the current measured in response to said first frequency.

11. The apparatus of claim 1 wherein the first antenna is embedded in or disposed on a container wall comprising non-magnetic composite materials.

12. The apparatus of claim 11 wherein the first antenna is a planar loop antenna disposed on a flexible substrate embedded in the container wall.

13. The apparatus of claim 12 wherein the second antenna is disposed on an outer surface of the container wall coaxially with the first antenna.

14. The apparatus of claim 1 wherein said gauging circuit detects amplitude of current in the second coil compensated for said gap during application of said excitation signal.

15. A fluid gauging apparatus for a tank comprising composite materials, the apparatus comprising: a capacitance that changes value based on the volume of fluid in the tank; a first antenna coupled to the capacitance and embedded in or disposed on a tank wall; said first antenna and capacitance forming a resonant circuit that operates as a load that changes in relation to the capacitance; a second antenna disposed exterior the tank and magnetically coupled to the first antenna; and detector means for applying an excitation signal at a number of excitation frequencies to the second antenna and for detecting, during application of said excitation signal, amplitude of current in the second antenna caused by mutual coupling with the first antenna to determine the fluid quantity as a function of the capacitance.

16. The apparatus of claim 15 wherein the tank is an aircraft fuel tank and the capacitance is part of a capacitive fuel level sensor.

17. The apparatus of claim 15 wherein the capacitance and first antenna form a resonant circuit having a resonance frequency that varies with fluid quantity in the tank.

18. The apparatus of claim 17 wherein the detector means comprises means for applying a frequency sweep to the resonant circuit to determine the resonant frequency based on current in the second antenna from the mutual coupling between the first and second antennas.

19. The apparatus of claim 17 wherein the detector means comprises means for applying two discrete excitation frequencies to the first antenna by mutual coupling with the second antenna, with one of the frequencies being selected based on the detected signal produced in response to the other frequency.

20. A method for gauging fluid quantity in a tank, comprising the steps of:
   a. using a capacitance as a variable parameter related to fluid quantity in the tank;
   b. using a first antenna to form a resonant circuit with the capacitance such that the resonant circuit has a resonance frequency that varies with the capacitance value;
   c. using a second antenna to interrogate inductively the resonant circuit operating as a load across a coreless gap based on applying an excitation signal having a number of excitation frequencies; and
   d. detecting the resonance frequency based on detecting, during application of said excitation signal, amplitude of current induced in the second antenna across said gap as a function of said load.

21. The method of claim 20 wherein the step of using a second antenna for inductive interrogation of the first antenna includes performing an-excitation signal frequency sweep to determine the resonant frequency.

22. The method of claim 20 wherein the step of using a second antenna for inductive interrogation of the first antenna includes using two discrete frequencies to produce respectively two measured signals, with the first frequency being selected below the expected resonant frequency of the resonant circuit and the second frequency being selected above the expected resonant frequency and based on the measured signal produced by the first frequency.

23. The method of claim 20 used for determining fuel quantity in an aircraft fuel tank comprising composite materials.

24. A fluid gauging apparatus for fluid in a container defined by a number of walls, comprising: an electrical element having a parameter that changes in relation to quantity of fluid in the container; a resonant circuit including a first inductive coil coupled to the electrical element such that a resonance characteristic of the resonant circuit changes in relation to the electrical element parameter; a second inductive coil magnetically coupled to the first coil across a gap defined by a portion of a container wall; and a detector circuit including means for applying an excitation signal having a number of different excitation signal frequencies to the second coil with said resonant circuit operating as a load for said detector circuit, and means for detecting resonant frequency of said load based on detecting, during application of said excitation signal, amplitude of current in the second coil induced by current in the first coil related to the electrical element parameter.

25. The apparatus of claim 24 wherein the electrical element parameter is capacitance, with said capacitance forming the resonant circuit with the first inductive coil.

26. The apparatus of claim 25 wherein said detecting means determines the resonant frequency of the resonant circuit in response to a frequency sweep applied to the second coil.

27. The apparatus of claim 25 wherein said detecting means determines the resonant frequency of the resonant circuit in response to two excitation signal frequencies applied to the second coil, wherein one of said excitation frequencies is selected below the expected resonant frequency and the other excitation frequency is selected above the expected resonant frequency and also based on the detected response to the first frequency.

28. The apparatus of claim 25 wherein the capacitance is formed by a capacitive fuel level probe in combination with an aircraft fuel tank.

* * * * *